United States Patent
Murata

(10) Patent No.: US 8,736,879 B2
(45) Date of Patent: May 27, 2014

(54) MANAGING SETTINGS FOR IMAGE PROCESSING JOB OPTIONS

(75) Inventor: Mareyuki Murata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 196 days.

(21) Appl. No.: 13/344,788

(22) Filed: Jan. 6, 2012

(65) Prior Publication Data

US 2012/0212776 A1 Aug. 23, 2012

(30) Foreign Application Priority Data

Feb. 22, 2011 (JP) ................................. 2011-036098

(51) Int. Cl.
*G06F 3/12* (2006.01)

(52) U.S. Cl.
USPC .......... 358/1.15; 358/1.13; 358/442; 358/448

(58) Field of Classification Search
USPC ........ 358/1.1, 1.13, 1.15, 400, 401, 442, 448, 358/468
See application file for complete search history.

(56) References Cited

U.S. PATENT DOCUMENTS

| | | | |
|---|---|---|---|
| 5,438,433 A * | 8/1995 | Reifman et al. | ............... 358/468 |
| 6,934,046 B1 | 8/2005 | Nishikawa et al. | |
| 7,239,409 B2 * | 7/2007 | Parry | ........................... 358/1.15 |
| 8,307,449 B2 | 11/2012 | Kimura et al. | |
| 2005/0012940 A1 | 1/2005 | Matsuda | |
| 2005/0036170 A1 | 2/2005 | Okuoka et al. | |
| 2008/0180740 A1 | 7/2008 | Kimura et al. | |

FOREIGN PATENT DOCUMENTS

| | | | |
|---|---|---|---|
| JP | 2001134394 A | | 5/2001 |
| JP | 2003177879 A | | 6/2003 |
| JP | 2003-186634 A | | 7/2003 |
| JP | 2004021390 A | | 1/2004 |
| JP | 2005-037549 A | | 2/2005 |
| JP | 2005037549 A | * | 2/2005 |
| JP | 2005-063099 A | | 3/2005 |
| JP | 2005085210 A | | 3/2005 |
| JP | 2007301854 A | | 11/2007 |
| JP | 2008-186176 A | | 8/2008 |
| JP | 2010241025 A | | 10/2010 |

OTHER PUBLICATIONS

Decision of Final Rejection issued in corresponding Japanese Patent Application No. 2011-036098 mailed Sep. 10, 2013.
Notice of Reasons for Rejection issued in Japanese Patent Application No. 2011-036098 mailed Feb. 19, 2013.

* cited by examiner

*Primary Examiner* — Thomas D Lee
(74) *Attorney, Agent, or Firm* — Banner & Witcoff, Ltd.

(57) ABSTRACT

Settings for various options in image processing jobs may be restricted or otherwise limited based on the settings for corresponding or different options selected in preceding image processing jobs. In one example, a user may wish to join a preceding job and a subsequent job into a single job for processing at one time. In such an example, the settings defined for options in the preceding job may affect selectable options or settings in the subsequent job. According to one aspect, multiple preceding jobs to be joined to a current subsequent job may have conflicting settings. Accordingly, a user may be requested to select one of the preceding jobs or one of the conflicting options to use for the subsequent job and the joint job.

13 Claims, 5 Drawing Sheets

MANAGING SETTINGS FOR IMAGE PROCESSING JOB OPTIONS

CROSS REFERENCE TO RELATED APPLICATION

This application claims priority from Japanese Patent Application No. 2011-036098 filed on Feb. 22, 2011. The content of the priority application is incorporated herein by reference in its entirety.

BACKGROUND

1. Technical Field

Aspects described herein relate to managing settings for options in image processing jobs.

2. Description of the Related Art

Image forming devices configured to join multiple print jobs, which are based on files created by different applications, into a single job have been proposed. A print job, for example, may correspond to a unit of printing which is created in accordance with various print options (i.e., setting information) for each file. The print options include the size of sheet, designation of pages(s) to be printed, whether double-sided printing is to be performed, whether joint printing is to be performed, finishing and the number of print copies. Various other print options may be included as well. In such image forming devices, a warning dialog indicating inconsistency in setting of print options may be displayed on a screen if a user does not select stapling as a print option for the first file and selects stapling for the second file.

BRIEF SUMMARY

In some instances, the above noted inconsistency is found only after the user selects the option of stapling for the second file in the image forming device described above. Regarding some other print options, in addition to the stapling, inconsistency in setting is not allowed among the multiple to-be-joined print jobs. Joining multiple jobs to a single job may be achieved in other devices than the image forming device.

This description provides a technique for determining, before the setting of print options, whether inconsistency in setting of the print options is allowed among multiple to-be-joined print jobs. Aspects described herein may also be applied to other types of image processing functions including copying, faxing and scanning Aspects of the present disclosure may be applicable to various embodiments, including a data processing device, a method of processing data, a printing device, a method of printing and a recording medium in which the data processing program described above is recorded.

DETAILED DESCRIPTION

An example embodiment will be described below with reference to FIGS. 1 to 5.

1. Electrical Configuration of Print System

Figure 1:
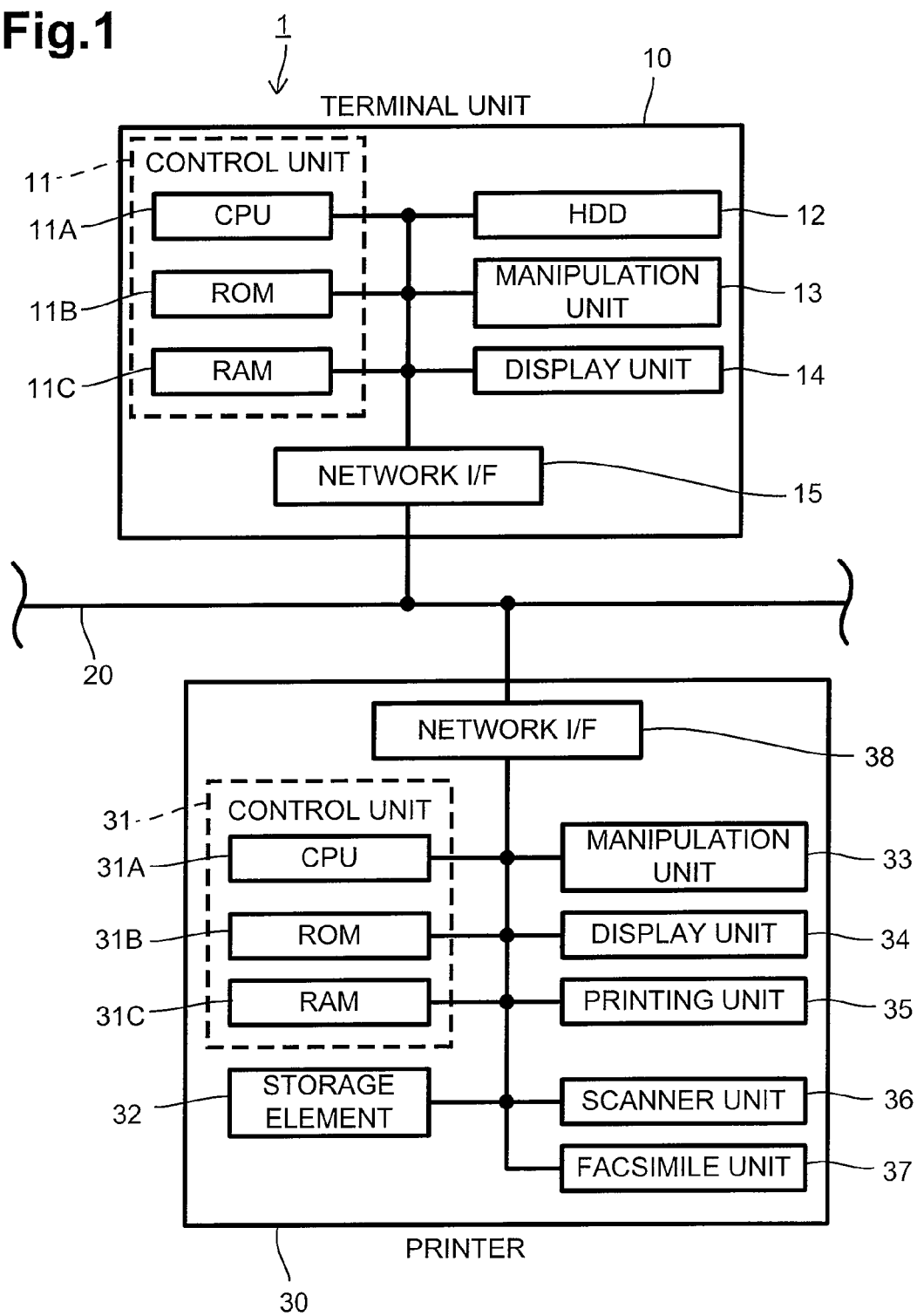
FIG. 1 is a block diagram illustrating an example electrical configuration of a print system according to an embodiment.

FIG. 1 is a block diagram illustrating an example electrical configuration of a print system 1 according to the present embodiment. The print system 1 includes a terminal unit 10 and a printer 30. The terminal unit 10 is an example of a data processing device, and may be a personal computer or a server. The printer 30 is an example of a process executing device.

The terminal unit 10 includes a control unit 11, a hard disk drive (HDD) 12, a manipulation unit 13 with a keyboard and a pointing device, a display unit 14 with a liquid crystal display, and a network interface 15 connected to a communication line 20. The control unit 11 includes a CPU 11A, ROM 11B and RAM 11C. The CPU 11A is an example of computers.

Various programs may be stored in the ROM 11B and the HDD 12. For example, the programs may include an operating system (OS), application software configured to generate to-be-printed image data, a printer driver configured to control the printer 30 and a data processing program configured to execute a job creation process as will be described in further detail herein. The control unit 11 controls the operation of the terminal unit 10 in accordance with one or more programs read from the ROM 11B and the HDD 12 and, at the same time, stores the processing result in the RAM 11C. The data processing program may be included in, or independent from, the printer driver.

In one example configuration, the printer 30 is a multi-function device which may functions as, for example, a copier, a scanner and a facsimile machine simultaneously or in different modes. The printer 30 includes a control unit 31, a storage element 32, a manipulation unit 33, a display unit 34, a printing unit 35, a scanner unit 36, a facsimile unit 37 and a network interface 38. The control unit 31 includes a processor such as CPU 31A, ROM 31B and RAM 31C. In some examples, the storage element 32 may include NVRAM and flash ROM.

Various programs for controlling the operation of the printer 30 may be stored in the ROM 31B and the storage element 32. The control unit 31 controls the operation of the printer 30 in accordance with one or more programs read from the ROM 31B and the storage element 32 and, may further store the processing result in the RAM 31C.

The manipulation unit 33 includes multiple buttons which enable a user to input, for example, a direction to start printing. The display unit 34 includes a liquid crystal display and a lamp and displays, for example, various setting screens and operational states. The printing unit 35 prints images in accordance the print data on a sheet, such as a paper sheet and an OHP sheet, in electrophotographic, inkjet, or other printing systems. The print data is obtained by converting image data received from, for example, the terminal unit and external memory, read data and facsimile data to a printable format. The network interface 38 is connected to, for example, the terminal unit 10 via the communication line 20 for mutual data communication.

The scanner unit 36 reads images of an original document which is not illustrated and generates read data which is processable by the printing unit 35. The facsimile unit 37 receives facsimile data from an external facsimile machine which is not illustrated.

2. Job Creation

Figure 2:
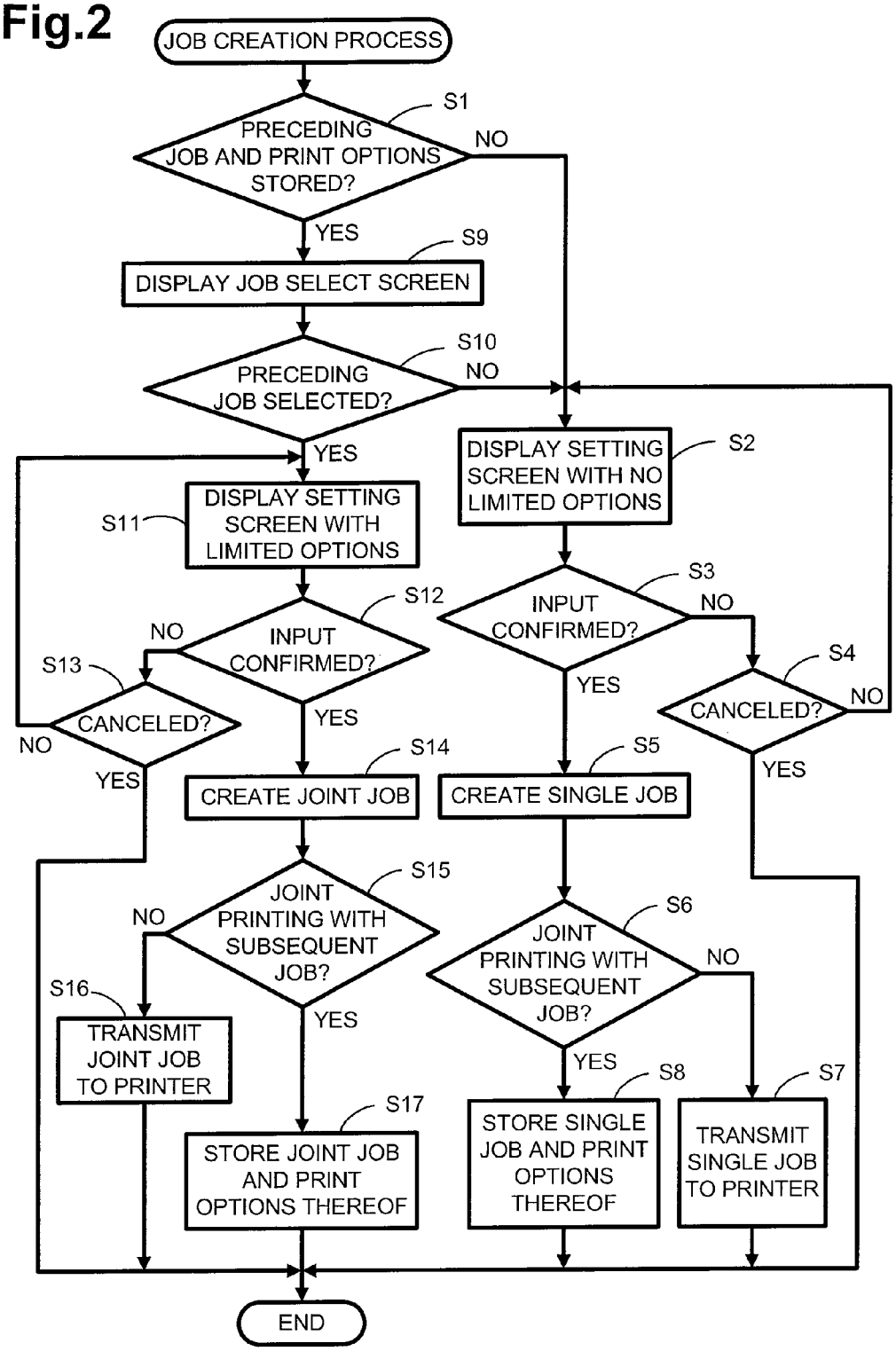
FIG. 2 is a flowchart illustrating an example job creation process.

When image data is generated in a device such as terminal unit 10 using, for example, application software and the user inputs a request to print the image data (e.g., through the manipulation unit 13), the control unit 11 is configured to execute a job creation process such as the job creation process illustrated in FIG. 2. The control unit 11 may execute the job creation process in accordance with the data processing program and, at the same time, start that printer driver.

In the example job creation process of FIG. 2, the control unit 11 initially determines whether a preceding job and the print options (i.e., setting information) thereof are stored in memory such as the HDD 12 (S1). For example, the preceding job may be stored in the HDD 12 before the execution of the current job creation process and may be created, in one example, by the terminal unit 10 (FIG. 1) during the job creation process. Alternatively, the job may be created by one or more devices external to the print system or external to a local area network hosting the print system.

A job may include a single unit of printing or may include multiple units of printing, where each unit of printing includes print data generated in accordance with the print options for each print request. Print data may include the print options, settings, image data or a single file and other print related parameters for execution of the print job. In one or more arrangements, the print data is preferably processable by the printer 30 and may include bitmap data. The print data may include image(s) corresponding to a single page or image(s) corresponding to multiple pages. The print options, which specify print conditions, may include a variety of parameters including the size of sheet on which the image is printed, designation of page(s) to be printed, whether double-sided printing is to be performed, whether joint printing is to be performed, finishing, the number of print copies, whether security printing is to be performed, and the time before switching to power saving mode.

2-1. Case in which No Preceding Job is Stored in HDD

Figure 3:
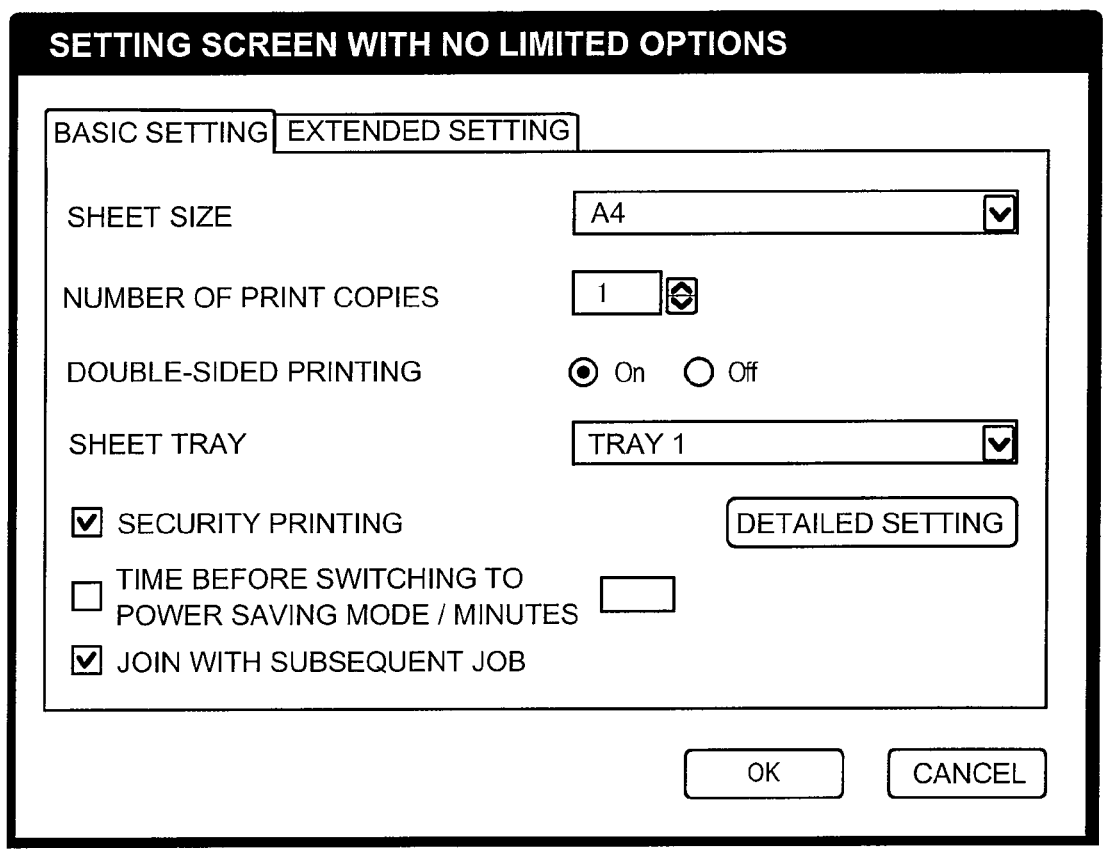
FIG. 3 is a schematic diagram of an example setting screen with no limited options.

If no preceding job and the print options thereof are stored in the HDD 12 or if the preceding job is stored but the print options thereof are not stored in the HDD 12 (S1: NO), the control unit 11, for example, reads data regarding a setting screen with no limited options from the HDD 12 and generates a display including the setting screen with no limited options (e.g., as illustrated in FIG. 3) be displayed on the display unit 14 (S2). The setting screen with no limited options is an example of a job setting screen. A print option may include multiple settings or values that may be individually (or as a whole) set as selectable or non-selectable. In some instances or arrangements, some of the selectable settings may be rendered non-selectable due to compatibility with data to be printed, compatibility with options selected in another print job, capabilities of a print device, capabilities of a terminal device and the like. Accordingly, this may result in a print option being restricted to a subset of all print settings associated with that option, where the subset includes less than all of the print settings. Rendering a setting non-selectable may include removing the setting from a settings menu of the option or disallowing interaction with (e.g., selecting of) the setting from the settings menu. Alternatively or additionally, the non-selectable setting may be displayed in a different visual appearance (e.g., grayed out, italicized, semi-transparent, etc.). In some instances, an option might only have one allowable value or setting, in which case, the option and setting thereof might not be modifiable.

The setting screen with no limited options illustrated in FIG. 3 includes print options, such as the size of sheet, the number of print copies, whether double-sided printing is to be performed, selection of the sheet tray of the printer 30, whether security printing is to be performed, and the time before switching the power saving mode. A first set of one or more values are displayed as the initial values of the print options on the setting screen with no limited options. For example, the values for all of the options in the setting screen may be changed arbitrarily without any limitations (e.g., with respect to other jobs). An option for setting whether joint printing with a subsequent job, which is created after the current job creation process is executed, is displayed on the setting screen with no limited options (see FIG. 3).

When the user sets various options and clicks an input confirmation button, i.e., an OK button, on the setting screen with no limited options (S3: YES), the control unit 11 executes a job creation process. In particular, the control unit 11 generates print data from the image data currently to be processed in accordance with the print options set on the setting screen with no limited options, and creates a job (e.g., a single print job) including the print data (S5). In one example, the single job is an independent job which does not join with a preceding job, if a preceding job exists. If the user clicks a Cancel button on the setting screen with no limited options (S3: NO and S4: YES), the control unit 11 terminates the job creation process. If the user clicks any button other than the OK button and the Cancel button on the setting screen with no limited options (S3: NO and S4: NO), the control unit 11 generates a screen corresponding to the selected button for display (S2). For example, if the user selects an extended setting tab, an extended setting screen (not shown) is displayed.

When the job is created (S5), the control unit 11 refers to the selected print options to determine if joint printing with a subsequent job was selected in the setting screen. If not (S6: NO), the control unit 11 transmits that single job to the printer 30 (S7) and terminates the job creation process. The printer 30 then executes the print operation in accordance with the received single job.

If, on the other hand, the control unit 11 determines that joint printing with the subsequent job was selected on the setting screen with no limited options (S6: YES), the control unit 11 executes a job storage process in which the generated single job and the print options thereof are stored in the HDD 12 (S8) as a preceding job (e.g., a job preceding a job that is subsequent created). The control unit 11 may then terminate the job creation process. For example, the single job is stored in the HDD 12 as a preceding job, and the transmission of the single job to the printer 30 is suspended or not initiated. It is therefore possible to generate a preceding job to be joined with a subsequent job and to store the preceding job in the HDD 12 for later use or processing.

2-2. Case in which Preceding Job is Stored in HDD

Figure 4:
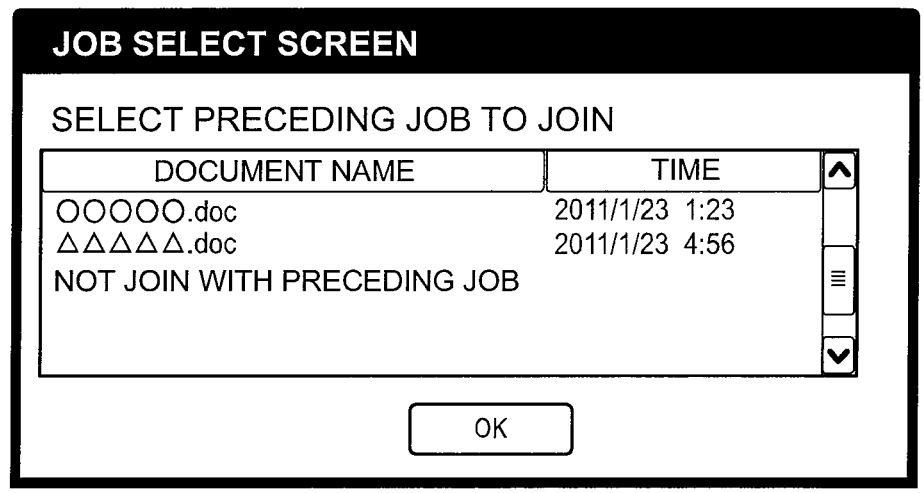
FIG. 4 is a schematic diagram of an example job select screen.

If a preceding job and print options thereof are stored in the HDD 12 (S1: YES), the control unit 11, for example, reads data regarding a job select screen from the HDD 12 and causes the job select screen illustrated in FIG. 4 to be displayed on the display unit 14 (S9). The job select screen is a user interface through which a user may select a preceding job to be joined with a current subsequent job. In FIG. 4, for example, identification information of two preceding jobs and an alternative option of no joining with a preceding job are provided. The time and date of the creation of the preceding jobs are also included in FIG. 4.

If the user does not select a preceding job for joint printing and clicks the OK button on the job select screen (S10: NO), the control unit 11 causes the display unit 14 to display the setting screen with no limited options (S2) and executes the processes of S3 to S8. With this, the subsequent job can be transmitted to the printer 30 earlier than the preceding job and be printed. In this case, a subsequent job creation process is executed in S5. If the user selects at least one preceding job and clicks the OK button on the job select screen (S10: YES), the control unit 11 executes, for example, a subsequent screen display process in which the control unit 11 reads data regarding the setting screen with limited options and the print options for the selected preceding job from the HDD 12, and lets the setting screen with limited options illustrated in FIG. 5 be displayed on the display unit 14 (S11). Here, the control unit 11 functions as a display control unit. The setting screen with limited options is, like the setting screen with no limited options, a user interface on which the user sets the print options. The setting screen with limited options illustrated in FIG. 5 includes the print options, such as the size of sheet, the number of print copies, whether double-sided printing is to be performed, selection of the sheet tray, whether security printing is to be performed, and the time before switching to the power saving mode. An option for setting the time before switching to the power saving mode may be an example of an option to be applied to the process executing device (e.g., a printer, facsimile device, scanner, etc.), where the option is not used for an image processing job.

Figure 5:
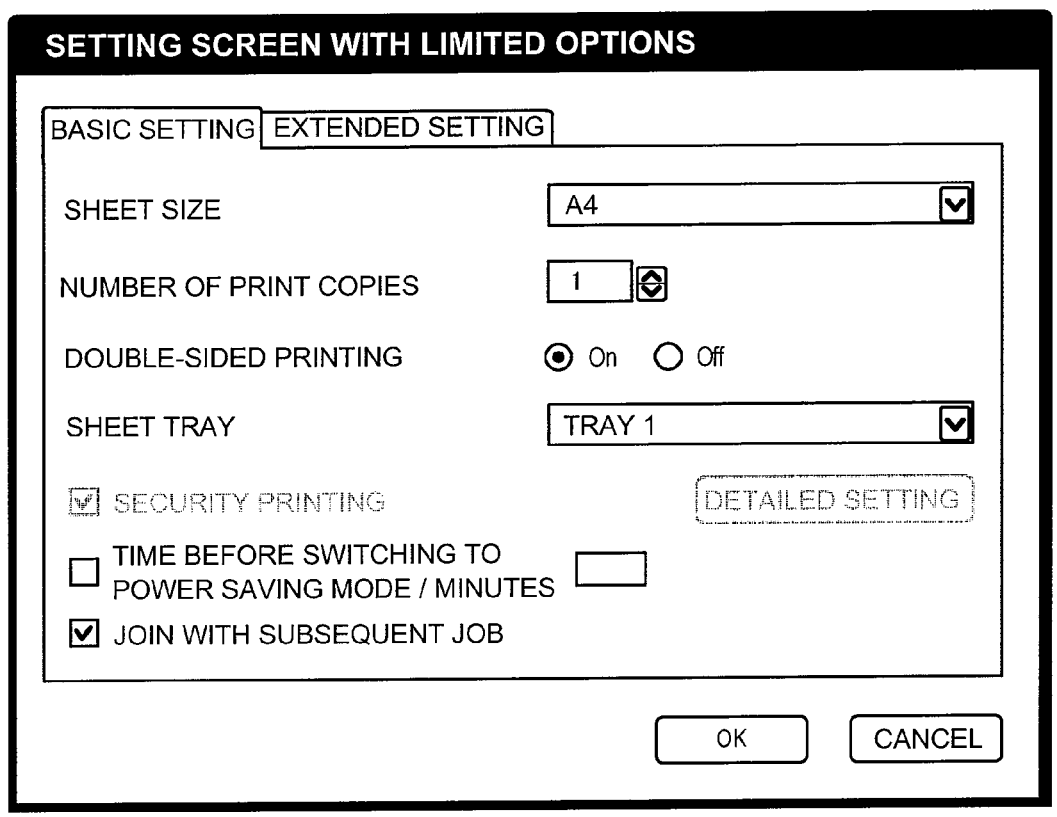
FIG. 5 is a schematic diagram of an example setting screen with limited options.

On the setting screen with limited options, unlike the setting screen with no limited options, values corresponding to the print options for the preceding job, not initial values, are displayed as a default value. Additionally, change in some print options within the setting screen with limited options may be limited in relation to the print option values selected for the preceding job to which the current job is to be joined. In some examples, the setting screen with limited options may include unlimited options and limited options. Unlimited options may be unrestricted if the option and the settings or values thereof are permitted to be inconsistent with the print option and/or option setting or value for the preceding job. Limited options and the settings or values of the limited options, however, may be required to be consistent with the print option for the preceding job. In some examples, a first print option in a current job may be affected by (e.g., limited by) a different second print option in a preceding job. Limited options or values of the limited options that have been set in a preceding job may be grayed out. For example, as illustrated in FIG. 5, the security printing option is grayed out (e.g., non-selectable/modifiable) because the security printing option was selected in the preceding job's setting screen. In contrast, the time before switching to power saving mode option is not grayed out (e.g., the option is selectable/modifiable) since the time before switching to power saving mode option or a particular value of the option was not selected in the preceding job's setting screen.

In the examples illustrated in FIG. 5, the limited options include whether security printing is to be performed and the time before switching to the power saving mode. The security printing may be an option which requires input of a password in the manipulation unit 13 of the printer 30 before a job transmitted to the printer 30 is printed. The password may be input by the user by clicking a detailed setting button on the setting screen with limited options. In one example, the security printing option may be used or effective when printing highly confidential image data.

The time before switching to power saving mode may correspond to an option for setting the amount of time before the printer 30 switches to the power saving mode. The printer 30 may then switch to power saving mode so long as no jobs are received since the last job is printed by the printer 30 and the amount of time has expired. The power saving mode is a standby mode in which power consumption of the printer 30 is lowered as compared with that during the printing operation, and is also called a sleep mode. Whether the security printing is to be performed and the time before switching to power saving mode are the limited options because inconsistency in these print options between multiple to-be-joined jobs might not be preferable.

In the screen illustrated in FIG. 5, since the option regarding the security printing is set for the preceding job, execution of security printing is displayed on the setting screen with limited options as the initial or default value and thus the security printing option is displayed in gray. Changes to the value of the security printing option might not be permitted. In contrast, since the option regarding the time before switching to power saving mode is not set for the preceding job, the option regarding the time before switching to power saving mode is not displayed in the gray color and thus modification of a default setting thereof is allowed.

In some examples, a first setting of an option for a first image processing job may cause an option of a second image processing job to be restricted. However, a second setting of an option for the first image processing job might not cause the option of a second image processing job to be restricted. For example, in the example of FIGS. 3 and 5, if the time before switching to power saving mode is not set or activated (e.g., for selecting the check box and entering an amount of time) in the preceding setting screen as shown in FIG. 3, the time before switching to power saving mode option in the subsequent setting screen (e.g., the setting screen with limited options of FIG. 5) might not be restricted to a particular value or restricted from modification. However, if the time before switching to power saving mode option is activated or set in the preceding setting screen of FIG. 5, the power saving mode option of the subsequent setting screen may be restricted to one or more particular settings. In some examples, the option may include more than two possible setting values. Additionally or alternatively, the setting of one option or type of option may affect another option or type of option (e.g., by restricting values that may be selected).

If two preceding jobs are selected on the job select screen of S9, the security printing option is set for the first preceding job and the time before switching to power saving mode is set for the second preceding job, both the option of whether security printing is to be performed option and the option of the time before switching to power saving mode are grayed out on the setting screen with limited options and thus setting thereof is not allowed. An option regarding joint printing with the subsequent job is also displayed on the setting screen (see FIG. 5). In one or more arrangements, the limited options may be grayed out and thus setting thereof is not allowed regardless of the printing options or the selected values of the printing options of the preceding job(s).

When the user sets various options and clicks an OK button on the setting screen with limited options (S12: YES), the control unit 11 executes a joint job creation process. Here, the control unit 11 functions as a joint job generation unit for generating a joint job from the multiple selected jobs. In particular, the control unit 11 generates print data from the image data currently to be processed in accordance with the print options set on the setting screen with limited options, and creates a single job which includes that print data and the print data included in the preceding job, i.e., a joint job in which the subsequent job and the preceding job are joined into a single job (S14). If the user clicks a Cancel button on the setting screen with limited options (S12: NO and S13: YES), the control unit 11 terminates the job creation process. If the user clicks any button other than the OK button and the Cancel button on the setting screen with limited options (S12: NO and S13: NO), the control unit 11 lets a screen corresponding to the button be displayed (S11).

When a joint job is created (S14), the control unit 11 refers to the selected print options or print option values of the joined jobs. If the control unit 11 determines that no joint printing with the subsequent job is set on the setting screen with limited options (S15: NO), the control unit 11 transmits that joint job to the printer 30 (S16) and terminates the job creation process. The printer 30 then executes the print operation in accordance with the multiple print data included in the received joint job. Since the multiple jobs created by independent print requests are collectively printed by the printer 30, the user can obtain his or her own printed matters without having those of other persons mixed thereto.

If the control unit 11 determines that joint printing with the subsequent job is set on the setting screen with limited options (S15: YES), the control unit 11 stores that joint job, the print options thereof, and the print options regarding at least the limited options in the HDD 12 (S17) and then terminates the job creation process. The joint job is stored in the HDD 12 as the preceding job, and the transmission thereof to the printer 30 is suspended.

The print options are set on an application setting screen provided by an application program and a driver setting screen provided by a printer driver. The setting screen with limited options and the setting screen with no limited options are examples of driver setting screens. If printing is requested on a display screen of the application, for example, the application setting screen is displayed. When a property button on that application setting screen is clicked, the driver setting screen is displayed. Print options may sometimes overlap with one another on both setting screens; therefore, a value set on the driver setting screen may sometimes be changed to a value set on the application setting screen. In order to prevent this phenomenon, the control unit 11 stores the values finally set on the application setting screen, not the values set on the driver setting screen, in the HDD 12 as the print options for the preceding job in S8 and S17 in the present embodiment. This allows that, even if the print options set on the setting screen with limited options or on the setting screen with no limited options are changed to the print options set by the application, the print options after the change can be stored in the HDD 12.

3. Effect of the Present Embodiment (1) According to the present embodiment, when the preceding job and the print options thereof are stored in the HDD 12, a setting screen with limited options illustrated in FIG. 5 is displayed on the display unit 14 (S11). The unlimited options that are permitted to be inconsistent with the print options for the preceding job are displayed on the setting screen along with limited options. In some examples, the limited options, which may be prevented from being inconsistent with the print options for the preceding job, are displayed on the setting screen with limited options in a manner to be distinguished from the unlimited options. Accordingly, it is possible to determine, before the setting of print options, whether inconsistency in setting of the print options is allowed among multiple to-be-joined print jobs.

(2) If multiple preceding jobs and the print options thereof are stored in the HDD 12, a job select screen on which the user selects all or some of the multiple preceding jobs is displayed on the display unit 14 (S9). In the subsequent screen display process, a setting screen with limited options on which unlimited options and limited options are determined in accordance with the print options for the selected preceding job is displayed (S11). It is therefore possible to select a preceding job which is to be joined with that subsequent job from among the multiple preceding jobs at the time of determining the subsequent job. The unlimited options and the limited options are determined on the setting screen with limited options in accordance with the print options for the selected preceding job. Accordingly, it is possible to determine, before the setting of print options, whether inconsistency in setting of the print options is allowed among multiple to-be-joined print jobs even if the multiple preceding jobs are stored.

(3) In the subsequent screen display process (S11), the printing option regarding encryption of the job is determined as the limited option; thus, it is possible to prevent inconsistency in setting of the print option regarding encryption of the job between the preceding job and the subsequent job.

(4) In the subsequent screen display process (S11), the printing option regarding the process executing device, i.e., the device itself of the printer 30, which executes the processes in relation to a joint job is determined as the limited option; thus, it is possible to prevent inconsistency in setting of the print option regarding the device itself between the preceding job and the subsequent job.

(5) If it is determined that no joint printing is set on the job select screen (S10: NO), the setting screen with no limited options in which all the printed options are unlimited options is displayed on the display unit in the subsequent screen display process, and the subsequent job is created independently of the preceding job in accordance with the second image data and the print options set on the setting screen with no limited options (S5). This allows the subsequent job to be created independently of the preceding job while the preceding job is still stored in the HDD 12.

Other Embodiments

Aspects described herein are not limited to the embodiment described with reference to the drawings; for example, the following various embodiments may be used as an alternative or in addition to the aspects described herein.

(1) In the described embodiment, the print system 1 which includes the terminal unit 10 and the printer 30 is illustrated by an example; other configurations and arrangements may also be applicable.

(A) In one example, the printer 30 may include a data processing device and a process executing device. In this configuration, the control unit 31 of the printer 30 executes the job creation process, causes the job select screen or other screens be displayed on the display unit 34 and stores the preceding job and the print options thereof in the storage element 32.

(B) According to another aspect, a control unit such as control unit 10 may be included as part of or correspond to a facsimile device. In such arrangements, the facsimile device may receive data for multiple facsimile jobs from different sources including components (e.g., scanning devices) of the facsimile device, other facsimile devices, computing devices, multi-function devices and the like. Accordingly, the control unit of the facsimile device may perform joint job creation processes as described herein using the job data received from the various sources. The joint job may correspond to a fax to another device such as another facsimile device or a computing device. Such a configuration may be used for transmitting multiple facsimiles as one facsimile job to reduce communication costs.

(C) A configuration in which an image reading unit is a data processing device, and a display unit itself, a terminal unit with a display unit and a printing device are process executing devices; the process executing device receives a job including data read from the image reading unit, displays the received data on a screen and prints and outputs the received data. In this configuration, the control unit incorporated in the image reading unit executes the job creation process. The print options are the information regarding image reading, such as reading resolution.

(2) In the described embodiment, the control unit 11 might only include a single CPU 11A; but the control unit may be a hardware circuit, such as an application specific integrated circuit (ASIC). Alternatively, the control unit may be multiple CPUs or hardware circuits, which cooperatively execute the job creation process. For example, one CPU may control each screen display and other CPUs may control other components.

(3) In the described embodiment, the print options regarding whether security printing is to be performed and the time before switching to power saving mode are illustrated as examples of the limited options; but the print options may be encryption of print data included in the job, selection of a specific process executing device from among multiple process executing devices, and the processing speed of the process executing device, e.g., the printing speed of the printer 30 in the described embodiment. Options may be designated as limited or unlimited as desired or needed.

(4) In the described embodiment, joint printing of the preceding job with the subsequent job may be set on the job select screen; but the joint printing may be set on a joint setting screen which is provided independent of the job select screen.

(5) In some examples, limited options may be changed as long as the limited options are distinguished from the unlimited options by means of, for example, the display with different colors or fonts. Alternatively, the limited options may be hidden and be unable to be changed.

(6) In the embodiment, if multiple preceding jobs are selected on the job select screen in S9 and the selected multiple preceding jobs have limited options which are different from or conflict with one another, an error may be displayed. Alternatively, the print options of the limited options regarding multiple preceding jobs may be displayed on the job select screen to allow the user to set print options of which job to be preferentially set as initial values on the setting screen. In one example, the user may be prompted to select a particular preceding job. The settings for that job may then be used restrict the limited options in the subsequent print job. The user-selected print option may then be applied to all preceding jobs or jobs for which the value was not selected may be removed from the joint job creation process.

(7) In the described embodiment, a joint job is created when the input is confirmed on the setting screen with limited options in S11 (S12: YES). However, if the option of joint job with the subsequent job is set, a joint job is created and, if the option of joint job is not set, a single job may be created and is stored in the HDD 12 as the preceding job.

(8) In the described embodiment, on the setting screen with limited options, unlike the setting screen with no limited options, values corresponding to the print options for the preceding job, not initial values, are displayed as the print options. However, initial values may be displayed regarding the unlimited options which may be inconsistent with the print options for the preceding job.

What is claimed is:

1. A non-transitory computer readable medium storing computer readable instructions that, when executed, cause a computer to:
   generate a first display for setting a first image processing option for a first image processing job, the first display including an option for specifying whether the first image processing job and a subsequent job are to be joined with each other;
   receive a setting for the first image processing option;
   generate the first image processing job in accordance with image data and the received setting;
   store the generated first image processing job, including the image data and the received setting, in memory upon determining that the first image processing job and the subsequent job are to be joined with each other;
   after storing the first image processing job, determine whether the first image processing job is to be joined with a second image processing job; and
   in response to determining that the first image processing job is to be joined with the second image processing job, generate a second display including a second image processing option for setting one or more options for the second image processing job, wherein the second image processing option is associated with a plurality of settings and wherein a selectable value of the second image processing option is restricted to a subset of the plurality of settings in the generated second display, wherein the subset includes less than all of the plurality of settings, and wherein the second image processing option is the first image processing option or is different from the first image processing option.

2. The non-transitory computer readable medium of claim 1, wherein the computer readable instructions, when executed, further cause the computer to:
   generate a single joint image processing job based on the first image processing job, the second image processing job and the setting for the first image processing option.

3. The non-transitory computer readable medium according to claim 2, wherein:
   the first and second image processing options include an option for a process executing device configured to execute a process in accordance with the single joint image processing job, and the option for the process executing device corresponds to a setting other than a setting used for an image processing job.

4. The non-transitory computer readable medium according to claim 1, wherein the computer readable instructions, when executed, further cause the computer to:
   during a job creation process for the second image processing job, generate a job selection screen display on which all or some of multiple preceding jobs are displayed for selection if multiple preceding jobs are stored in memory, wherein a preceding job corresponds to an image processing job created prior to the second image processing job.

5. The non-transitory computer readable medium according to claim 4, wherein the multiple preceding jobs includes the first image processing job; and
   generating the second display includes determining whether the second image processing option is to be restricted, wherein the determination is made in accordance with the first image processing option and the setting thereof when the first image processing job is selected from the job selection screen display.

6. The non-transitory computer readable medium according to claim 1, wherein:
the first image processing option for the first image processing job and the second image processing option for the second image processing job include an option for encryption of an image processing job.

7. The non-transitory computer readable medium according to claim 1, wherein:
determining whether the first image processing job is to be joined with the second image processing job includes generating a joint setting screen including a user-selectable option indicating whether the first image processing job is to be joined with a subsequent job, and
upon determining that the first image processing job and the second image processing job are not to be joined with each other, generating a second third display including the second image processing option in an unrestricted manner such that each of the plurality of settings are selectable through the second image processing option in the third display.

8. The non-transitory computer readable medium according to claim 1, wherein:
when the first image processing job is created in response to a direction from a first application different from a second application configured to generate the first display, the first image processing job is created in accordance with settings for print options set by the first application, without using the settings for the print options set on the first display; and
the settings for the print options set by the first application are stored in the memory.

9. The non-transitory computer readable medium of claim 1, wherein the computer readable instructions, when executed, further cause the computer to:
determine whether the setting for the first image processing option corresponds to a first value;
in response to determining that the setting for the first image processing option corresponds to the first value, generate the second display with the selectable value of the second image processing option being restricted to the subset of the plurality of settings;
determine whether the setting for the first image processing option corresponds to a second value; and
in response to determining that the setting for the first image processing option corresponds to the second value, generate a third display including the second image processing option, wherein the second image processing option is unrestricted in the third display such that each of the plurality of settings are selectable through the second image processing option.

10. The non-transitory computer readable medium of claim 1, wherein the computer readable instructions, when executed, further cause the computer to:
determine whether the first and second image processing jobs are to be combined with a third image processing job, wherein the first and third image processing jobs precede the second image processing job;
determine whether the setting for the first image processing option conflicts with a setting for a third image processing option of the third image processing job;
in response to determining that the setting for the first image processing option conflicts with the setting for the third image processing option, prompt the user to make a selection of one of the first image processing job and the third image processing job, wherein the second image processing option is restricted based on the selection; and in response to determining that the setting for the first image processing option does not conflict with the setting for the third image processing option, restrict the second image processing option based on the setting of the first image processing option and the setting of the third image processing option.

11. An apparatus comprising:
a processor; and
memory operatively coupled to the processor and storing computer readable instructions that, when executed by the processor, cause the apparatus to:
generate a first display for setting a first image processing option for a first image processing job, the first display including an option for specifying whether the first image processing job and a subsequent job are to be joined with each other;
receive a setting for the first image processing option;
generate the first image processing job in accordance with image data and the received setting;
store the generated first image processing job including the image data and the received setting in memory upon determining that the first image processing job and the subsequent job are to be joined with each other;
after storing the first image processing job, determine whether the first image processing job is to be joined with a second image processing job; and
in response to determining that the first image processing job is to be joined with the second image processing job, generate a second display including a second image processing option for setting one or more options for the second image processing job, wherein the second image processing option is associated with a plurality of settings and wherein a selectable value of the second image processing option is restricted to a subset of the plurality of settings in the generated second display, wherein the subset includes less than all of the plurality of settings, and wherein the second image processing option is the first image processing option or is different from the first image processing option.

12. A non-transitory computer readable medium storing computer readable instructions that, when executed, cause a computer to:
receive a setting for a first image processing option for a first image processing job;
determine whether the first image processing job is to be joined with a second image processing job; and
in response to determining that the first image processing job is to be joined with the second image processing job:
determine whether the setting for the first image processing option corresponds to a first value or a second value;
in response to determining that the setting for the first image processing option corresponds to the first value, generate a first display including a second image processing option for setting one or more options for the second image processing job, wherein the second image processing option is associated with a plurality of settings and wherein a selectable value for the second image processing option is restricted to a subset of the plurality of settings in the generated first display, wherein the subset includes less than all of the plurality of settings; and
in response to determining that the setting for the first image processing option corresponds to the second value, generate a second display including the second image processing option, wherein the second image processing option is unrestricted in the second display such that each of the plurality of settings is selectable through the second image processing option, wherein the second image processing option is the first image processing option or is different from the first image processing option.

13. A non-transitory computer readable medium storing computer readable instructions that, when executed, cause a computer to:

receive a setting for a first image processing option for a first image processing job;

determine whether the first image processing job and a second image processing job are to be combined with a third image processing job, wherein the first and third image processing jobs precede the second image processing job, wherein the second image processing job is associated with a second image processing option; and in response to determining that the first and second image processing jobs are to be combined with the third image processing job:

determine whether the setting for the first image processing option conflicts with a setting for a third image processing option of the third image processing job;

in response to determining that the setting for the first image processing option conflicts with the setting for the third image processing option, prompt the user to make a selection of one of the first image processing job and the third image processing job; and generate a first display including the second image processing option for setting one or more options for the second image processing job, wherein the second image processing option is associated with a plurality of settings and wherein a selectable value of the second image processing option is restricted to a subset of the plurality of settings in the generated first display, wherein the subset includes less than all of the plurality of settings, wherein the second image processing option is the first image processing option or is different from the first image processing option, wherein the second image processing option is restricted based on the selection of the one of the first image processing job and the third image processing job, if the setting for the first image processing option conflicts with the setting for the third image processing option, and wherein the second image processing option is restricted based on the setting of the first image processing option and the setting of the third image processing option, if the setting for the first image processing option does not conflict with the setting for the third image processing option.

* * * * *